United States Patent [19]

Gallagher

[11] Patent Number: 5,072,363
[45] Date of Patent: Dec. 10, 1991

[54] MULTIMODE RESOURCE ARBITER PROVIDING ROUND ROBIN ARBITTRATION OR A MODIFIED PRIORITY ARBITRATION

[75] Inventor: Andrew M. Gallagher, Long Beach, N.Y.

[73] Assignee: Harris Corporation, Melbourne, Fla.

[21] Appl. No.: 455,759

[22] Filed: Dec. 22, 1989

[51] Int. Cl.$^5$ .................. G06F 13/14; G06F 13/00
[52] U.S. Cl. .................. 395/725; 364/242.6; 364/240; 364/242.92; 364/251.3; 364/DIG. 1; 340/825.5
[58] Field of Search ................ 340/825.5; 364/200 MS File, 900 MS File

[56] References Cited

U.S. PATENT DOCUMENTS

| | | | |
|---|---|---|---|
| 4,172,284 | 10/1979 | Heinrich et al. | 364/200 |
| 4,232,294 | 11/1980 | Burke et al. | 364/200 |
| 4,257,095 | 3/1981 | Nadir | 364/200 |
| 4,458,314 | 7/1984 | Grimes | 364/200 |
| 4,470,114 | 9/1984 | Gerhold | 364/200 |
| 4,499,538 | 2/1985 | Finger et al. | 364/200 |
| 4,560,985 | 12/1985 | Strecker et al. | 340/825.5 |
| 4,633,394 | 12/1986 | Georgion et al. | 364/200 |
| 4,641,266 | 2/1987 | Walsh | 364/200 |
| 4,648,029 | 3/1987 | Cooper et al. | 364/200 |
| 4,760,515 | 7/1988 | Malmquist et al. | 364/200 |
| 4,787,033 | 11/1988 | Bomba et al. | 364/200 |
| 4,814,974 | 3/1989 | Narayanan et al. | 364/200 |

Primary Examiner—Michael R. Fleming
Assistant Examiner—Gopal C. Ray
Attorney, Agent, or Firm—Scully, Scott, Murphy & Presser

[57] ABSTRACT

A multimode shared resource arbiter circuit is provided by a programmable array logic module programmed to provide round robin arbitration, or round robin/modified priority arbitration between requests for access to a shared resource, such as a data bus, which is normally provided with only priority arbitration between different access requests. The programmable array logic module is programmed to provide a first option for a round robin arbitration system between different bus access requests, and a second option to put one bus request on a priority basis while other bus requests are round robin arbitrated. The programmable array logic module is programmed to provide a multistate counter cyclically driven between multiple count states by a clock, and each count state having associated therewith a particular request for access to the bus, and if a particular request for access to the bus becomes active while the counter is at its associated count state, the active request is granted and passed as an output, and the counter is frozen at the associated count state, and when the active request is released, the counter resumes being cyclically driven between its multiple count states to resume further round robin arbitration between access requests. The arbiter circuit of the present invention is also applicable to other shared resources such as a shared main storage, a shared RAM memory, etc.

10 Claims, 5 Drawing Sheets

MULTIMODE RESOURCE ARBITER PROVIDING ROUND ROBIN ARBITRATION OR A MODIFIED PRIORITY ARBITRATION

BACKGROUND OF THE INVENTION

1. Field of the Invention

The present invention relates generally to a circuit for providing round robin arbitration, or round robin/modified priority arbitration, between requests for access to a shared resource which is normally provided with only priority arbitration between different access requests.

More particularly, the present invention is specifically described with the shared resource being a data bus, and provides a first option for a round robin arbitration system between different bus access requests, as opposed to a normal priority arbitration system, and a second option to put one bus request on a priority basis while other bus requests are round robin arbitrated. However, the present invention is also applicable to other shared resources such as a shared main storage, a shared RAM memory, etc.

Bus arbitration between masters for buses such as the Versa Module European (VME) bus can be accomplished by a commercially available MC68452 Bus Arbitration Module (BAM). The MC68452 Bus Arbitration Module is a bipolar asynchronous bus controller module which allows multiple local MPU buses to be multiplexed onto a common global bus, enabling the local buses to share memory, I/O devices, and communicate with each other easily and efficiently. It performs arbitration for up to eight users of a global bus, is expandable, and implements a fixed physical priority between bus requests. The commercially available Motorola 68452 Bus Arbitration Module only provides for priority arbitration between different bus access requests.

SUMMARY OF THE INVENTION

Accordingly, it is a primary object of the present invention to provide an option for round robin arbitration between different access requests for access to a shared resource such as a data bus which is normally provided with only priority arbitration between access requests.

A further object of the subject invention is the provision of a logic circuit for providing round robin arbitration or round robin/modified priority arbitration for access to a shared resource such as a data bus, which is normally provided with only priority arbitration by a commercially available MC68452 Bus Arbitration Module.

The present invention provides a system for providing round robin arbitration between requests for access to a shared resource, such as a data bus, comprising a multistate counter cyclically driven between multiple count states by a clock. Each count state has associated therewith a particular request for access to the shared resource, and if a particular request for access to the shared resource becomes active while the counter is at its associated count state, the active request is granted and passed as an output. The counter is frozen at the associated count state, and when the active request is released, the counter resumes being cyclically driven between its multiple count states to resume further round robin arbitration between access requests.

In a preferred embodiment, the multistate counter comprises a two bit counter having four count states between which it is cyclically driven, and each of the four count states has associated therewith respectively one of four requests for access to a shared resource. The multistate counter is implemented in a Programmable Array Logic (PAL) chip, and the programmable array logic chip is also programmed to implement the round robin arbitration system.

Moreover, a first option is also provided wherein one request for access to the shared resource is given a priority, such that it is asserted ahead of the other three requests which are round robin arbitrated.

In accordance with the teachings of a specific preferred embodiment herein, the present invention provides, in the context of bus arbitration between masters by a commercially available MC68452 Bus Arbitration Module, a first option, selectable by a switch, for a round robin arbitration system, as opposed to a normal priority arbitration system. Within the round robin mode, a second option is provided, selectable by a second switch, to put one bus request on a priority basis while up to three other bus requests are round robin arbitrated. In the first option mode, external logic circuits sequentially clock in the bus request lines. If the first bus request line is not asserted, the next bus request line is clocked in. If the first bus request line is asserted, it is directed as an input to the MC68452 chip, and the next line is clocked in, when the BBSY line thereto is negated, as provided during normal operation of the MC68452 chip.

BRIEF DESCRIPTION OF THE DRAWINGS

The foregoing objects and advantages of the present invention for a multimode resource arbiter may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
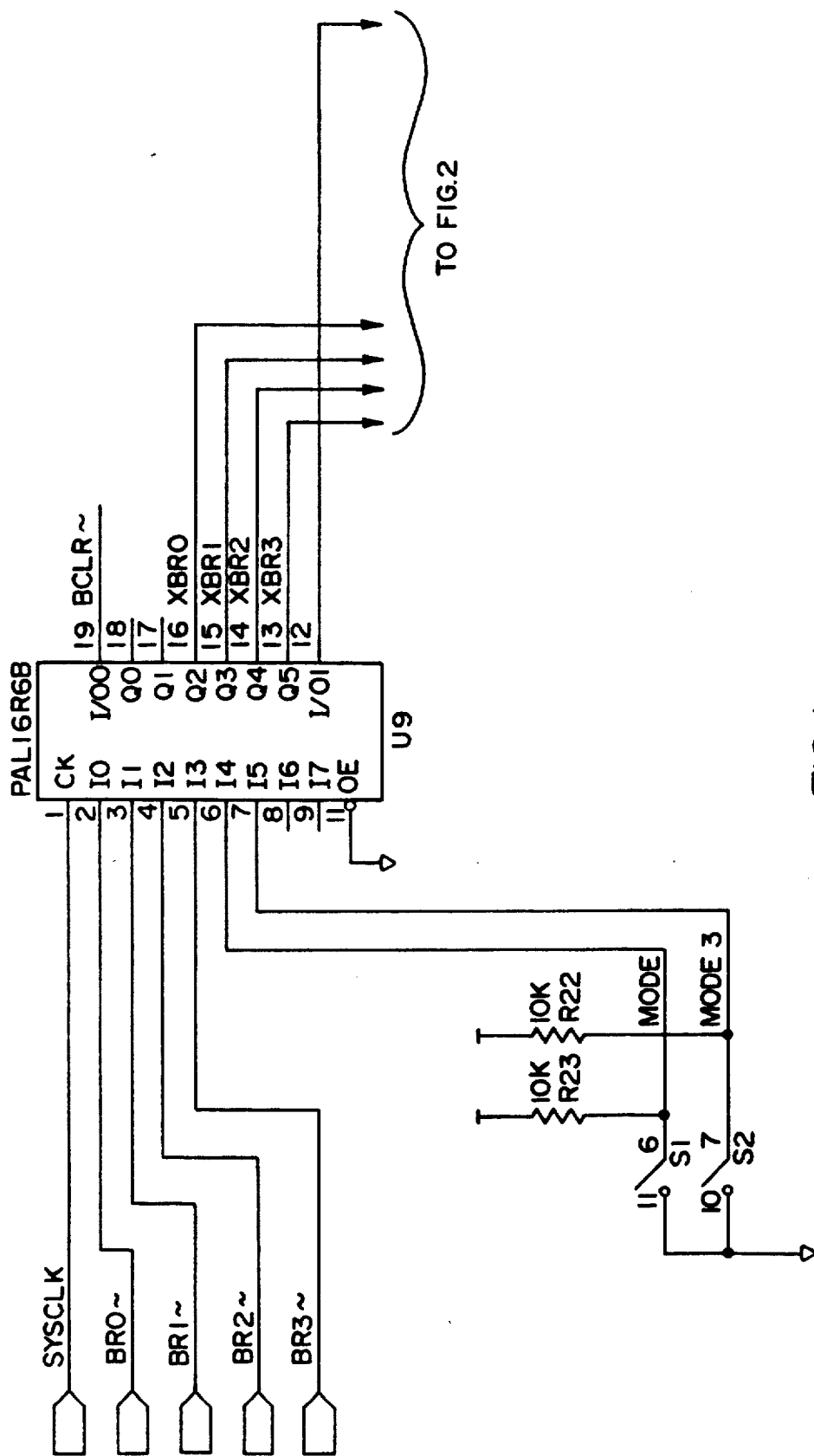
FIG. 1 is an electrical schematic of an exemplary embodiment of a multimode bus arbiter circuit constructed pursuant to the teachings of the present invention.

In general, bus requests in an exemplary system having up to four different bus requests, BR0, BR1, BR2 and BR3, are prioritized with BR3 having the highest priority. The existing arbitration schemes implement a priority system where if level 3 and level 2 are always present alternately, then level 1 and level 0 would never be serviced. A solution to this problem is to implement a round robin arbitration system wherein a circuit samples all four inputs at fixed intervals and passes requests according to a time slice method rather than a fixed priority basis. Pursuant to the round robin option of the present invention, the XBRn outputs are "filtered" outputs which become active when the time slice or count is at the correct sequence and the "unfiltered" input is also active. Alternatively in a straight priority arbitration mode, the output follows the "unfiltered" input. A third mode is also available in which bus request BR3 is available in a straight priority mode, while bus requests BR0, BR1 and BR2 are always handled in a round robin mode, such that bus request BR3 will always be asserted when it becomes active.

The equations hereinbelow for Q1 and Q2 implement a binary 2 bit (00, 01, 10, 11) counter whose count is incremented at a 16 MHz rate if a Bus Request (BR0, BR1, BR2, BR3) is not active at the current count value. If a bus request is active at the current count value, the counter freezes at that count value (that of the bus request level) until the bus request has been released or becomes inactive. In general, the bus requests BR0, BR1, BR2 and BR3 are sampled at a 16 MHz rate until a bus request becomes active. At that point, the sampling is stopped and the active bus request is passed to the arbitration chip. Upon release of the original request, the circuit samples the next consecutive request, thereby implementing a round robin arbitration system.

Figure 2:
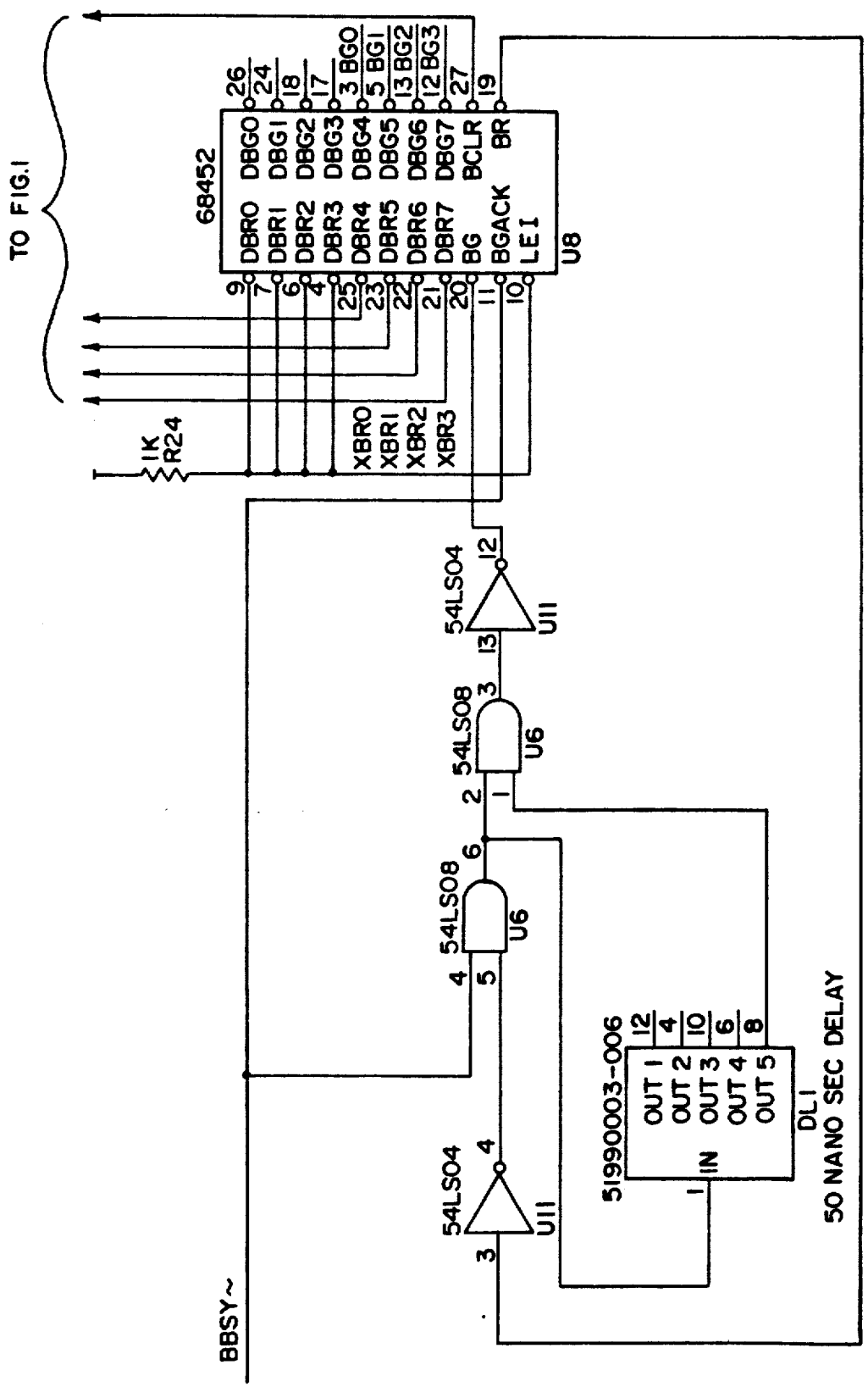
FIG. 2 is an electrical schematic of a MC68452 Bus Arbitration Module to which the multimode bus arbiter circuit of FIG. 1, is connected.

Referring to the drawings in detail, FIG. 1 is an electrical schematic showing the external logic circuit of the present invention and the connections thereof extending to a commercially available MC68452 module illustrated in FIG. 2, while FIG. 2 is a schematic showing the input connections from the external logic circuit to a commercially available MC68452 Bus Arbitration Module which provides for Versa Module European (VME) bus arbitration.

Referring specifically to FIG. 1, a commercially available PAL16R6B chip is a Programmable Array Logic (PAL) chip programmed as described in greater detail hereinbelow with reference to FIGS. 3-5 to provide round robin arbitration or round robin/modified priority arbitration for access to a data bus, which is normally serviced and provided with only priority arbitration by the MC68452 chip. With the PAL chip programmed as described, the logic circuit provides a first option, selectable by the closure of a switch S1, for a round robin arbitration system, as opposed to the normal priority arbitration system. Within the round robin mode, a second option is provided, selectable by closure of a second switch S2, to put one bus request BR3 on a priority basis while three other bus requests BR0, BR1 and BR2 are round robin arbitrated.

In the disclosed circuit, when the first switch S1 is set open, the round robin circuitry is disabled and all four bus request lines feed directly to the MC68452 chip where they are selected on a priority arbitration basis, as normally provided by that chip. Closure of switch S1 causes the bus request lines BR0, BR1, BR2 and BR3 to be processed by the external logic circuit of FIG. 1 to be selected on a round robin arbitration basis. A second switch S2 can be closed while in the round robin mode with switch S1 closed to enable bus request 03 to bypass the round robin circuitry and feed directly into the MC68452 chip, while providing round robin arbitration between bus requests 00, 01 and 02.

The following are the pin definitions for pins 1 through 20 of the PAL16l R6B module or chip.

1-CK, 2-BR0~, 3-BR1~, 4-BR2~, 5-BR3~, 6-MODE, 7-MODE3-, 8-NC, 9-NCl, 10-GND, 11-/G, 12-XBCLR~, 13-XBR3~, 14-XBR2~, 15-XBR1~, 16-XBR0~, 17-Q2, 18-Q1, 19-BCLR~, 20-VCC

The PAL chip is programmed in accordance with the following operations, with the following operators, / means low, ~ means active when low, * is AND, and + is OR, := means registered output which is clocked through at each clock pulse (F/F), and = means a combinatorial output which is instantaneously available.

The PAL chip is initially programmed to form a two bit, four word counter, programmed pursuant to equations (1) and (2) hereinbelow, and schematically illustrated in FIG. 5 in which the four states of the two bit (Q2, Q1) clock: (0,0); (0,1); (1,0); and (1,1) are shown configured in a state machine in which the twelve o'clock position is occupied by Q2=0, Q1=0 (shown as (0,0)), the three o'clock position is (0,1), the six o'clock position is (1,0), and the nine o'clock position is (1,1). Each of these four states have a bus request BRn associated therewith, numbered for the four positions as : (0,0), BR0; (0,1), BR1; (1,0), BR2; and (1,1), BR3.

Pursuant to equation (1), Q1 of the count (Q2,Q1) is low when (:=means registered and clocked) Q1 is low (/Q1) and (*) Q2 is low (Q2)(defines count (0,0) and (*) BR0 is active by being low (BR0~) (this essentially means stay at count (0,0) if BR0 is active), or (+) Q1 is high (Q1) and (*) Q2 is low (/Q2)(this defines count (0,1) and (*) BR1 is high and inactive (BR1~)(this essentially means move from count (0,1) when BR1 is inactive) or (+) Q1 is low (/Q1) and (*) Q2 is high (Q2)(this defines count (1.0)), and BR2 is enabled by being low (/BR2~)(this essentially means stay at count (1,0) if BR2 is active, or Q1 is high (Q1), and (*) Q2 is high (Q2)(defines count (1,1)) and (*) BR3 is high and inactive (this essentially means move from count (1,1) when BR3 is inactive).

Similarly pursuant to equation (2), Q2 of the count (Q2,Q1) is low when (:=means registered and clocked) Q1 is low (/Q1) and (*) Q2 is low (/Q2)(defines count (0,0)) (means stay at count Q2=0 since the count of the state machine proceeds from (0,0) to (0,1)) or (+) Q1 is high (Q1) and (*) Q2 is high (Q2) (defines count (1,1)) and (*) BR3 is high and inactive (BR3~)(means stay at count Q2=0 since the count of the state machine proceeds from (1,1) to (0,0)) if BR3 is inactive) or when Q1 is high (Q1) and (*) Q2 is low (/Q2)(defines count (0,1)) and BR1 is low and active (/BR1~)(means stay at count (0,1) when BR1 is active).

Equation (3) states that XBR0 (the output from the PAL at pin 16 which is an input to DBR4 of the MC68452 module at pin 25) is to be active and low (/XBR0~) when (:= in a registered and clocked manner) Q1 is low (/Q1) and (*) Q2 is low (/Q2)(defines count (0,0)) and (*) BR0 is low and active (/BR0~) and (*) mode is low (/mode) (switch S1 is closed)(means that when switch S1 is closed, at count (0,0), when BR0 is active, then activate XBR0), or (+) BR0 is active and low (/BR0~) and (*) the mode is high and inactive (MODE~)(with switch 1 open and BR0 active, activate XBR0).

Equations (4) and (5) are similar to equation (3) for activation of respectively output lines XBR1 and XBR2.

Equation (6) is similar to equation (3) for activation of output line XBR3 but adds to the first line of the equation and (*) mode 3 switch is high and inactive (MODE3~), and adds a third line to the equation or (+)

BR3 is low and active (/BR3~) and (*) mode 3 is low and active (/MODE3~)(when the mode 3 switch S2 is closed and BR3 is active, then activate /XBR3 which leads to the highest priority input DBR7 of the 68452 module).

Accordingly, the PAL is programmed to form a two bit clock which is regularly clocked at 16 MHz by the system clock to either remain at the same count or change the count as indicated by equations (1) and (2). Likewise, the PAL is programmed to activate lines XBR0, XBR1, XBR2 and XBR3 according to equations (3), (4), (5), and (6), which depend upon the count, the bus requests in, and the positions of switches S1 and S2 to either (1) remain in the normal prioritized arbitration mode of operation of module 68452 when switches S1 and S2 are open, or (2) be in a round robin arbitration mode when switch S1 is closed and S3 is open, or (3) be in the mode 3 round robin/modified priority mode of operation when both switches S1 and S2 are closed.

Figure 3:
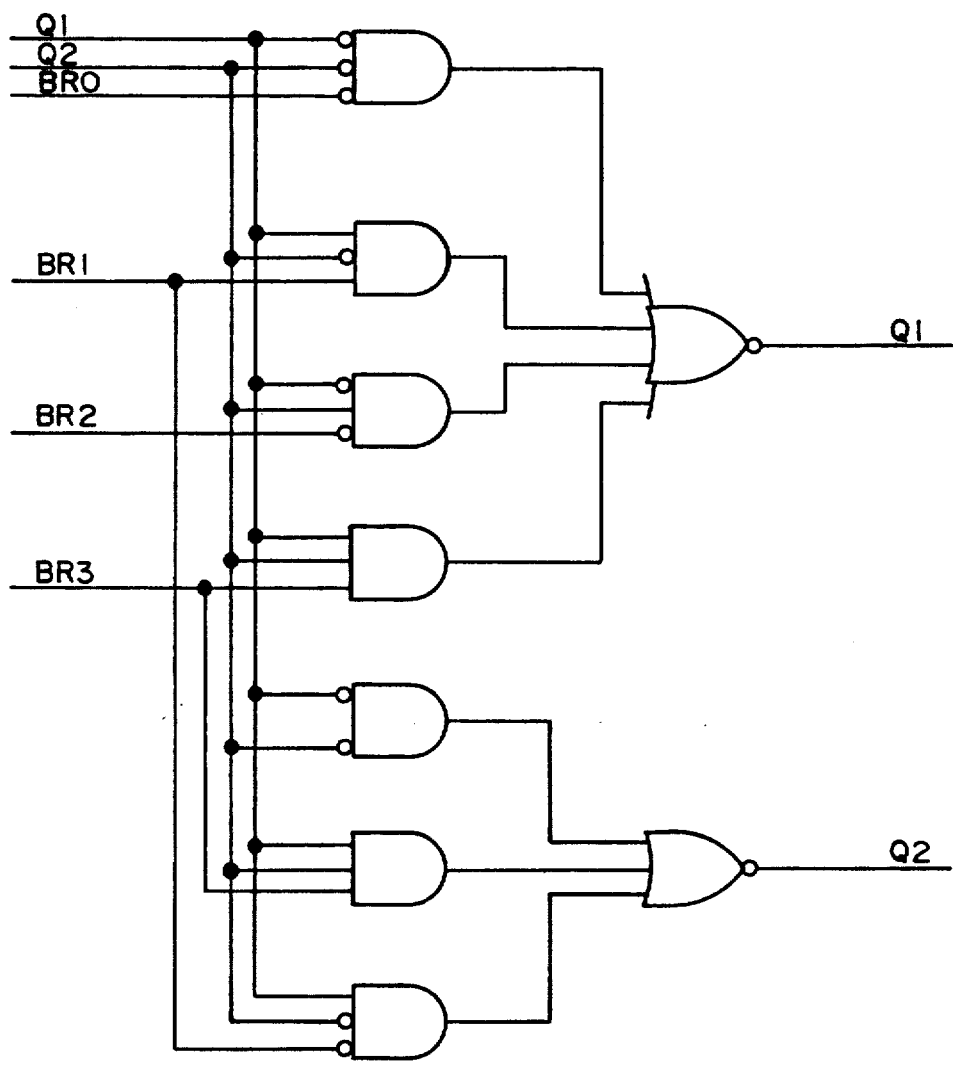
FIG. 3 illustrates the logic necessary to provide for logical count conditions (Q1) and (Q2) as explained hereinbelow.

Logical condition Q1 on pin 18, which is active low, FIG. 3, is defined by, $$/Q1 := /Q1 * /Q2 * /BR0\textasciitilde \\ + Q1 * /Q2 * BR1\textasciitilde \\ + /Q1 * Q2 * /BR2\textasciitilde \\ + Q1 * Q2 * BR3\textasciitilde \quad (1)$$

Logical condition Q2 on pin 17, which is active low, FIG. 3, is defined by, $$/Q2 := /Q1 * /Q2 + Q1 * Q2 * BR3\textasciitilde + Q1 * /Q2 * /BR1\textasciitilde \quad (2)$$

Figure 4:
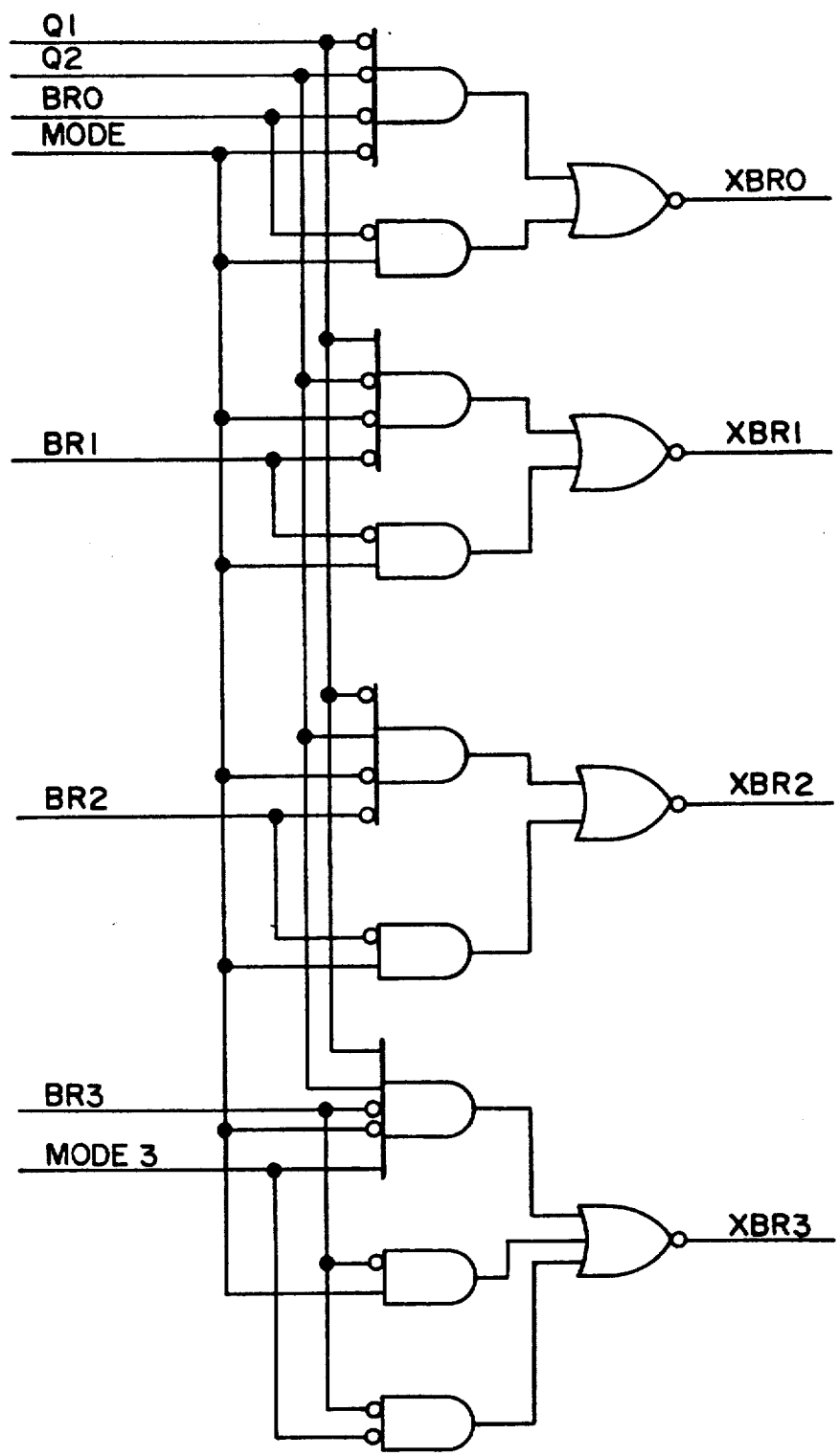
FIG. 4 illustrates the logic necessary to provide for the logical conditions (XBR0), (XBR1), (XBR2) and (XBR3) as explained hereinbelow.
Figure 5:
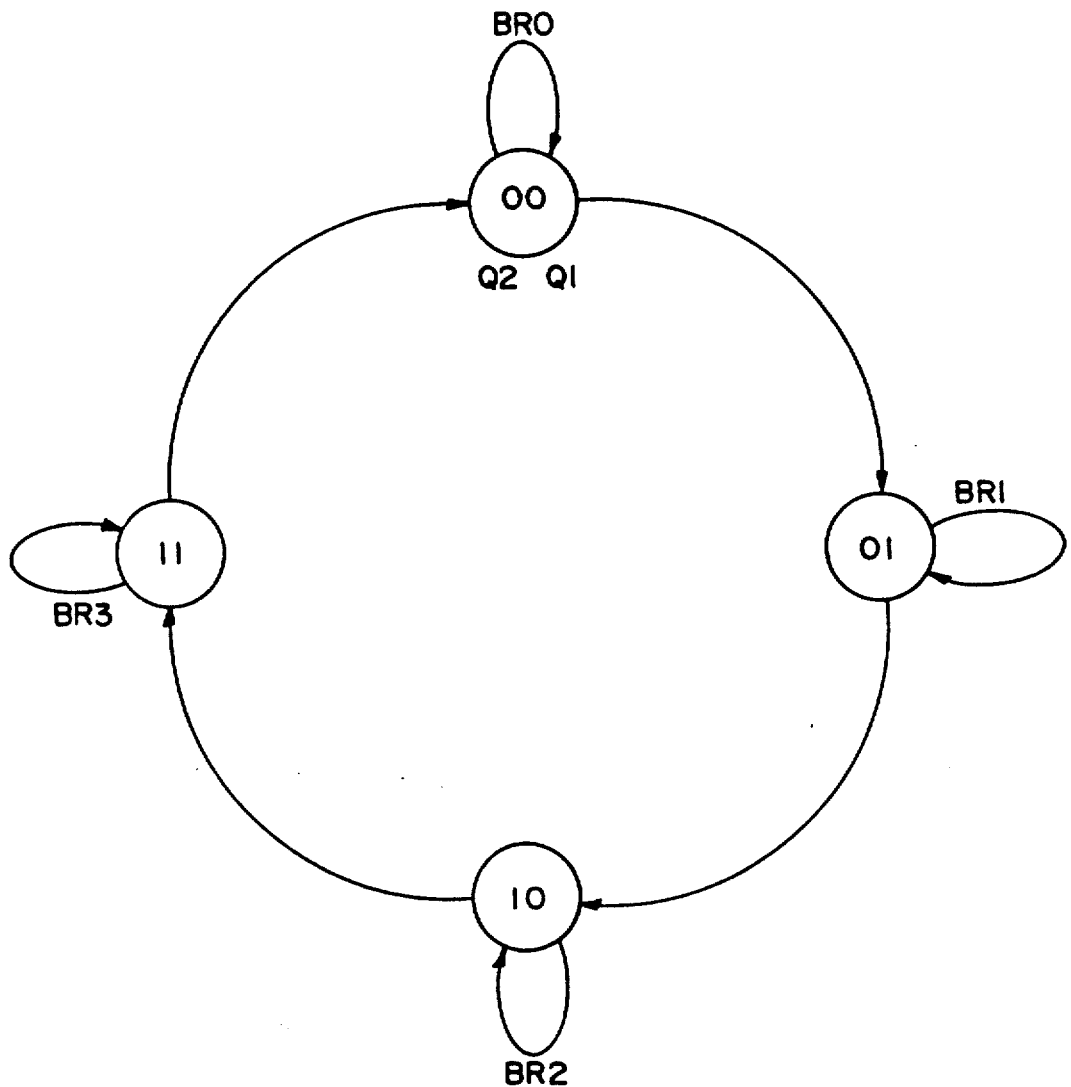
FIG. 5 is a schematic illustration of the programming of a PAL module to form a 2 bit counter or state machine.

Logical condition XBR0 on pin 16, which is active low, FIG. 4, is defined by, $$/XBR0\textasciitilde := /Q1 * /Q2 * /BR0\textasciitilde * /MODE \\ + /BR0\textasciitilde * MODE \quad (3)$$

Logical condition XBR1 on pin 15, which is active low, FIG. 4, is defined by, $$/XBR1\textasciitilde := Q1 * /Q2 * /BR1\textasciitilde * /MODE \\ + /BR1\textasciitilde * MODE \quad (4)$$

Logical condition XBR2 on pin 14, which is active low, FIG. 4, is defined by, $$/XBR2\textasciitilde := /Q1 * Q2 * /BR2\textasciitilde * /MODE \\ + /BR2\textasciitilde * MODE \quad (5)$$

Logical condition XBR3 on pin 13, which is active low, FIG. 4, is defined by, $$/XBR3\textasciitilde := Q1 * Q2 * /BR3\textasciitilde * /MODE * MODE3 \\ + /BR3\textasciitilde * MODE + /BR3\textasciitilde * /MODE3 \quad (6)$$

In the operation of the circuit of FIG. 1, switches S1 and S2 provide a low state when closed, and are pulled high through the 10K resistor R23 or R22 when open. If switches S1 and S2 remain open, or if switch S1 is open and switch S2 is closed, then bus requests BR0~, BR1~, BR2~, and BR3~, as received as inputs to the circuit pass directly through the PAL chip to outputs at pins 16, 15, 14 and 13, from which they are transferred as inputs to the 68452 chip at pins 25, 23, 22 and 21, where they are arbitrated on a normal priority basis.

If switch S1 is closed and switch S2 is open, the round robin mode is selected, in which the PAL chip selects the manner of passage of the bus requests BR0, BR1, BR2 and BR3, as shown by the logical conditions hereinabove, to pins 21, 22, 23 and 25, with pin 21 having the highest priority and pin 25 having the lowest priority.

If switches S1 and S2 are both closed, selecting mode 3, then bus request BR3~ passes directly to pin 21 of the MC68452 chip, giving it the highest priority, while the manner of passage of requests BR0~, BR1~ and BR2~ are determined by the PAL to pins 22, 23 and 25 of the MC68452 chip.

In operation of the MC68452 module of FIG. 2, the signals are described as follows.

DEVICE BUS REQUEST (DBR7-DBR0)—These eight inputs are active low and are used to indicate that a user demands a bus cycle(s). The DBR inputs are prioritized with DBR7 as the highest and DBR0 the lowest. This priority scheme is only used when two or more devices have pending requests.

DEVICE BUS GRANT (DBG7-DBG0)—These active low outputs indicate that a user has obtained the bus, should bring BGACK active, and begin the transfer. The DBG is removed when the user brings BGACK active.

BUS GRANT ACKNOWLEDGE (BGACK)—This active low input indicates that a user has taken control of the bus. Each user must be able to generate this signal. When BGACK becomes active the DBGn will be removed.

The BAM provides a central arbitration function by utilizing a separate request-grant pair for each user as opposed to multiplexing all requests into a single line and daisy-chaining the grant. Each BAM circuit has eight DBR-DBG request-grant pairs. When a device desires to use the bus it brings its DBR low (active). Since the BAM circuit operates asynchronously there are no restrictions placed on the active transition of the DBRn signals. There are however, two minor restrictions placed on the inactive transition. The restrictions are: 1) all requests must remain active until they receive their grant signal and bring the BGACK active, and 2) the request is removed before the BGACK is released.

Each bus request line has a corresponding bus grant line (DBGn). After a requesting device brings its request active it must monitor the DBGn signal. When this signal becomes active the user has obtained the bus, should bring BGACK active, and begin transferring. The device can maintain control of the shared bus as long as the BGACK signal remains active. This three level handshake (request-grant-acknowledge) allows the BAM to support single or block type transfers with equal ease.

While several embodiments and variations of the present invention for a multimode bus arbiter are described in detail herein, it should be apparent that the disclosure and teachings of the present invention will suggest many alternative designs to those skilled in the art.

What is claimed is:

1. A system for providing round robin arbitration between requests for access to a shared resource such as a data bus, the usage of which is shared in a time multiplex mode by a plurality of users of the shared resource, comprising a single central multistate counter associated with the shared resource which services all requests for access to the shared resource and is cyclically driven between multiple count states by a clock, and each count state having associated therewith a request for access to the shared resource by one of the plurality of users, and if one of the plurality of users requests access to the shared resource while the counter is at the count state associated with that user, the request for access to the shared resource is granted and the counter is frozen at the associated count state, and when the request for access to the shared resource is released, the counter resumes being cyclically driven between its multiple count states to resume further round robin arbitration between access requests until a request for access to the shared resource is received from one of the plurality of users while the counter is in the count state associated with that particular user, and if one of the plurality of users requests access to the shared resource while the counter is not at the count state associated with that user, the request for access to the shared resource is denied until the counter is driven to the count state associated with that user.

2. A system for providing round robin arbitration between requests for access to a shared resource as claimed in claim 1, said multistate counter comprising a two bit counter having four count states between which it is cyclically driven, and each of the four count states having associated therewith respectively one of four requests for access to the shared resource by one of four users of the shared resource.

3. A system for providing round robin arbitration between requests for access to a shared resource as claimed in claim 2, wherein said multistate counter in implemented in a programmable array logic chip, and said programmable array logic chip is programmed to implement the round robin arbitration system for each of the four particular requests for access to the shared resource by each of the four users associated with each count state of the counter.

4. A system for providing round robin arbitration between requests for access to a shared resource as claimed in claim 3, wherein requests for access outputs of said programmable array logic chip are directed as inputs to an arbitration module which grants access to the shared resource strictly on a priority basis.

5. A system for providing round robin arbitration between requests for access to a shared resource as claimed in claim 4, wherein one request for access to the shared resource is given a priority, such that the priority request for access is granted ahead of the other three requests which are round robin arbitrated and wherein the system provides three arbitration modes, a first round robin arbitration mode, a second combined round robin and priority mode, and a third strictly priority mode provided by said arbitration module.

6. A system for providing round robin arbitration between requests for access to a shared resource as claimed in claim 5, wherein said shared resource is a data bus provided with only priority arbitration by a bus arbitration module, and the programmable array logic module directs access requests as outputs thereof to said bus arbitration module, and provides a first option mode, selectable by a switch, for a round robin arbitration system between requests for access to the bus in which the programmable array logic circuit sequentially clocks in the bus request lines such that if a first bus request line is not asserted, the next bus request line is clocked in, and if the first bus request line is asserted, it is directed as an input to the bus arbitration module, and the next line is clocked in, and the system also provides a second option, selectable by a second switch, to put one bus request on a priority basis while the three other bus requests are round robin arbitrated.

7. A system for providing round robin arbitration between requests for access to a shared resource as claimed in claim 6, wherein said shared resource is a data bus provided with only priority arbitration by a bus arbitration module, and the programmable array logic module directs access requests as outputs thereof to said bus arbitration module, and provides a first option mode, selectable by a switch, for a round robin arbitration system between requests for access to the bus in which the programmable array logic circuit sequentially clocks in the bus request lines such that if a first bus request line is not asserted, the next bus request line is clocked in, and if the first bus requet line is asserted, it is directed as an input to the bus arbitration module, and next line is clocked in, and the system also provides a second option, selectable by a second switch, to put one bus request on a priority basis while the three other bus requests are round robin arbitrated.

8. A system for providing round robin arbitration between requests for access to a shared resource as claimed in claim 1, wherein said multistate counter in implemented in a programmable array logic chip, and said programmable array logic chip is programmed to implement the round robin arbitration system for each of the plurality of users of the shared resource associated with each count state of the counter.

9. A system for providing round robin arbitration between requests for access to a shared resource as claimed in claim 8, wherein one request for access to the shared resource is given a priority, such that the priority request for access is granted ahead of the other three requests which are round robin arbitrated and wherein the system provides three arbitration modes, a first round robin arbitration mode, a second combined round robin and priority mode, and a third strictly priority mode provided by said arbitration module.

10. A system for providing round robin arbitration between requests for access to a shared resource as claimed in claim 1, wherein requests for access outputs of said system for providing round robin arbitration programmable array logic chip are directed as inputs to an arbitration module which grants access to the shared resource strictly on a priority basis.

* * * * *

UNITED STATES PATENT AND TRADEMARK OFFICE
CERTIFICATE OF CORRECTION

PATENT NO. : 5,072,363

DATED : December 10, 1991

INVENTOR(S) : Andrew M. Gallagher

It is certified that error appears in the above-identified patent and that said Letters Patent is hereby corrected as shown below:

On the Title Page, Section [54], line 3: "ABRITTRATION" should read as --ARBITRATION--

Column 1, line 3: "ARBITTRATION" should read as --ARBITRATION--

Column 2, line 48: "1, is" should read as --1 is--

Column 3, line 68: "PAL161R6B" should read as --PAL16R6B--

Column 4, line 25; "low (Q2)" should read as --low (/Q2)--

Column 4, line 26: "(BRO~)" should read as --(/BRO~)--

Column 7, line 29, Claim 3: "counter in" should read as --counter is--

Column 8, line 26, Claim 7: "requet" should read as --request--

Column 8, line 28, Claim 7: "and next" should read as --and the next--

Column 8, line 34, Claim 8: "counter in" should read as --counter is--

UNITED STATES PATENT AND TRADEMARK OFFICE
CERTIFICATE OF CORRECTION

PATENT NO. : 5,072,363

DATED : December 10, 1991

INVENTOR(S) : Andrew M. Gallagher

It is certified that error appears in the above-identified patent and that said Letters Patent is hereby corrected as shown below:

Column 8, line 34, claim 8, "counter in" should read--counter is--.

Signed and Sealed this

Thirteenth Day of April, 1993

*Attest:*

STEPHEN G. KUNIN

*Attesting Officer*     *Acting Commissioner of Patents and Trademarks*